Patented Feb. 26, 1935

1,992,482

UNITED STATES PATENT OFFICE 1,992,482

HIGH-PRESSURE BRICK CONTAINING MAGNESIA, AND PROCESS OF MAKING THE SAME

Russell P. Heuer, Bryn Mawr, Pa., assignor to General Refractories Company, a corporation of Pennsylvania No Drawing. Application January 9, 1934, Serial No. 705,971

19 Claims. (Cl. 25—156)

My invention relates to bonded unburned magnesia and magnesia-chrome brick, and to methods of making the same. This application is a continuation in part of my application Serial No. 323,890, filed December 5, 1928.

A purpose of my invention is to make an unburned magnesia or magnesia-chrome refractory brick which is equal or superior in density, hot and cold strength, resistance to metal and slag penetration and infusibility to the burned magnesia brick of the prior art.

A further purpose is to produce an unburned magnesia or magnesia-chrome refractory brick which, by virtue of the combination of definite proportions of larger and smaller graded sizes, and the presence of the bond, has a high strength while the brick is at atmospheric temperatures, and which, by virtue of the small amount of bond, is refractory at the high temperatures of use.

A further purpose is to bond an unfired magnesia or magnesia-chrome brick of very high density and very low porosity without reducing the strength of the brick at high temperatures or rendering the brick more fusible.

A further purpose is to use 45% to 65% (preferably 52% to 58%, or better 55%) of larger magnesia and/or chrome particles between 10 and 30 mesh per linear inch and 55% to 35% (preferably 48% to 42%, or better 45%) of smaller magnesia and/or chrome particles through 50 mesh per linear inch (preferably 60 mesh per linear inch, or better 80 mesh per linear inch), with an appreciable but small amount of bond, such as an acid electrolyte (sodium acid sulphate, sodium dichromate, etc.) in the presence of clay, or such as sodium silicate, in magnesia or magnesia-chrome brick, and to subject the mixture of the magnesia or magnesia-chrome particles and the bond, to molding pressure high enough to form the mixture into a brick (1000 pounds per square inch, preferably 5,000 pounds per square inch, or better 10,000 pounds per square inch).

A further purpose is to employ a water soluble bond between the properly sized and combined particles of an unfired magnesia or magnesia-chrome brick.

Further purposes appear in the specification and in the claims.

My invention relates to the methods involved and to the products obtained.

In my U. S. Patent No. 1,851,181, granted March 29, 1932, I have disclosed how brick of high density and low porosity may be made from many non-plastic refractory materials by grading the particles into larger and smaller sizes, with the partial or complete elimination of intermediate sizes, combining the larger and smaller sizes in definite proportions by weight and desirably molding under high pressure. My patent No. 1,851,181 indicates that the introduction of material which will cause plastic flow either in the hot or cold brick is undesirable and likely to defeat the purposes sought.

In the case of an unburned magnesia or magnesia-chrome brick, which must develop considerable cold strength without firing, there is a definite advantage in introducing a limited quantity of bond into a mix of properly graded and combined sizes. If the quantity of bond is limited, it need not encourage shrinkage or plastic flow in either the hot or the cold brick.

A wholly satisfactory unburned magnesia or magnesia-chrome brick can be made without using any bond, provided the sizes of the particles are properly graded and combined, and suitable molding procedure is used. If, to the properly graded and combined magnesia or magnesia-chrome mix, a small amount of bond be added, a definite improvement in the unburned brick will be noted, particularly in its strength before being subjected to firing temperature, its subsequent cold and hot strength, and its resistance to spalling, with little or no change in its fusibility. A larger quantity of bond harmfully influences the brick, particularly by rendering it markedly more fusible, much weaker at furnace temperature, much less resistant to spalling, to abrasion, to molten slags, to metals and to hot products of combustion, or decidedly more subject to pronounced shrinkage.

In an unburned magnesia or magnesia-chrome brick, there is then an optimum range of bond content. Without limiting myself to any theory, I may say that I suppose that the optimum range of bond content is due to the fact that, as soon as the bond is present in great enough quantity to actually space one non-plastic refractory particle from another, it encourages plastic flow, rendering the brick much more fusible, less resistant to spalling and weaker at high temperatures. Shrinkage of the bond produces abnormal shrinkage of the brick. Where the bond is present in such small amount that it merely forms a coating or film on the non-plastic magnesia or magnesia and chrome particles, it does not appreciably space them, does not assist plastic flow and does not reduce the high temperature properties.

Magnesia, chrome and mixtures of magnesia and chrome give good adherence to the law of particle grading and combining as mentioned in my Patent No. 1,851,181. It is therefore to be expected that magnesia and magnesia-chrome brick will be advantageously affected by particle grading and combining. To produce magnesia and magnesia-chrome brick of high density and correspondingly little void space, the intermediate size particles should be eliminated or substantially eliminated, and the larger and smaller particles combined in proper proportions. Chrome behaves very similarly to magnesia, and my invention contemplates the use of mixtures of magnesia and chrome in any proportions, although the present application is concerned more especially with mixtures of magnesia and chrome consisting preponderantly of magnesia. Where magnesia and chrome are mixed, the particles of any given size may be mixtures of magnesia and chrome particles, or the particles of that size may be entirely magnesia or entirely chrome, in which case the chrome or magnesia, as the case may be, will comprise particles of some other size.

In order to obtain a maximum of interfitting of the non-plastic particles, I grade the sizes of the ground refractory for making up the brick mix into larger, intermediate and smaller particles. As only the larger and smaller particles are preferably used in the brick, the intermediates may be reground to make smaller particles, or the system of grinding may be so regulated that only larger and smaller particles are produced. Obviously, if separate sources of larger and smaller particles are available, the particles from such separate sources may be used.

Magnesia and chrome particles used by me are non-plastic. This is very advantageous as plastic particles have colloidally associated water which renders them unsuitable for the production of brick intended for use without burning. The colloidally associated water is driven off in drying, and during use. An unburned brick of plastic material in a furnace structure such as a furnace lining is apt to shrink and develop void spaces during use.

The larger particles should be capable of passing a screen of 10 mesh per linear inch and of being retained upon a screen of 30 mesh per linear inch. The larger particles should preferably be between 10 and 20 mesh per linear inch, as best results are obtained when the larger particles are of nearly uniform graded size.

The larger particles may be between 3 and 30 mesh per linear inch, or, better, between 6 and 30 mesh per linear inch. The more uniform the size of the larger particles, the better.

The smaller particles should be capable of passing through a screen of 50 mesh per linear inch, and preferably will pass 60 mesh per linear inch, or better 80 mesh per linear inch. The intermediate particles, which are substantially eliminated, will be between 30 and 50 mesh per linear inch, or preferably between 30 and 60, 30 and 80, 20 and 60, or 20 and 80 mesh per linear inch.

Between 45% and 65% (preferably 52% and 58%) of larger magnesia or magnesia-chrome particles and between 55% and 35% (preferably 48% and 42%) of smaller magnesia or magnesia-chrome particles should be employed to produce a magnesia or magnesia-chrome brick of high density. The quantity of larger and smaller particles will be roughly equal. It is best to eliminate the intermediate particles, but, less desirably, some of them, perhaps 10% or even 20%, may be used. The most desirable mix comprises about 55% of larger particles and about 45% of smaller particles, reductions in these percentages being made for the bond.

Water soluble bonds are preferable to insoluble bonds because water soluble bonds may be distributed in small quantity very uniformly over the particles, without danger of spacing individual particles, and thus encouraging shrinkage, while insoluble bonds are difficult to distribute uniformly in small quantity.

The quantity of water soluble bond should not exceed 5% of the dry brick. Sodium silicate in small amount is a suitable bond for magnesia and magnesia-chrome brick, the amount of sodium silicate being appreciable but preferably less than 3% (5% maximum), or better, less than 2%. Organic bonds such as dextrine, gum arabic or sulphite liquor (an appreciable quantity but preferably less than 3%, or better less than 2%, or still better less than 1%, with 5% as a maximum) may be employed.

Magnesia and mixtures of magnesia and chrome may be bonded by sodium acid sulphate (sodium bisulphate) or sodium dichromate, in the presence of clay, as explained in my U. S. Patent No. 1,859,512, granted May 24, 1932. The acid electrolyte should preferably form only 2% or less (5% maximum) of the dry brick, and the clay about 2% of the dry brick, and certainly less than 5%.

Mixtures of magnesia and chrome containing considerable chrome may be bonded by an acid electrolyte, such as sodium acid sulphate, in the presence of finely divided magnesia, as disclosed in my U. S. Patent No. 1,845,968, granted February 16, 1932. I will preferably use about 2% or less (5% maximum) of sodium acid sulphate, with about 10% of finely divided magnesia particles for bonding purposes.

I contemplate that conventional brick-making methods will be used. I have already explained how the magnesia or magnesia and chrome particles will be ground, graded as to size, and the larger and smaller sizes will be combined in the proper proportions. Prior to molding the mix will be suitably moistened and the binder introduced. Where a water soluble binder such as sodium silicate or an organic substance (dextrine, gum arabic, sulphite liquor), etc., is used, a water solution of the binder will be employed to moisten the mix and impart to the mix 5% or less of water soluble binder.

If desired the water solution of the binder may first be mixed with the fine particles before the coarse particles are added.

The use of high pressure for molding the brick is desirable, as the high pressure assists in producing maximum interfitting. The molding pressure should exceed 1000 pounds per square inch, or preferably 5000 pounds per square inch, or still better 10,000 pounds per square inch. The high pressure produces tight interfitting of the particles which develops high density.

After molding, the brick are dried, preferably at a temperature of 100° to 300° C. This results in driving off excess moisture, but is not in any sense a burning or firing operation. The brick are now ready for use in unburned condition.

I am aware that it is not new to bond magnesia or magnesia-chrome mixtures with sodium silicate or organic binders and to use such bonded bricks in furnace linings without previous burning. I have found that such unburned brick are lacking in refractoriness or strength, resistance to slag or metal attack, have undesirably high porosity or shrink in volume in service due to poor contact and interfitting of the constituent particles and the presence of excessive amounts of bonding substance between the particles. By selecting the proper size particles and densely compacting them under pressure exceeding 1000 pounds per square inch I have been able to obtain desirable brick having the necessary particle interfitting without burning and with a minimum of bonding substance. Such brick can be made equal to or better than conventional burned magnesia brick.

One example of such a brick is the following composition:

| | Per cent |
|---|---|
| Dead burned magnesite | 76 |
| Chrome ore | 20 |
| Ball clay | 2 |
| Sodium bisulphate | 2 |

A screen test of the brick mix shows:

| | Per cent |
|---|---|
| On 6 mesh per linear inch | Nil |
| Thru 6 on 10 mesh per linear inch | 15 |
| Thru 10 on 20 mesh per linear inch | 20 |
| Thru 20 on 35 mesh per linear inch | 15 |
| Thru 35 on 65 mesh per linear inch | 5 |
| Thru 65 mesh per linear inch | 45 |

When molded under a pressure of 10,000 pounds per square inch and dried at 125° C. such brick have shown a brick specific gravity as high as 3.0 and cold crushing strengths up to 14,000 pounds per square inch. As brick having a cold crushing strength of about 2,000 pounds per square inch may be shipped and installed commercially, it will be evident that the unburned magnesia and magnesia-chrome brick of my invention are amply strong. The brick according to my invention are very dense, having a porosity of less than 20%.

According to my invention, I procure larger and smaller particles of magnesia and/or chrome, add a limited quantity of the proper binder ordinarily in a solution that serves to moisten the mix, mold the brick, preferably under high pressure, and dry the molded brick. The brick is then ready for use in unfired condition, and may be inserted in a furnace structure such as a furnace lining, exactly like a fired brick.

Where the brick contains both magnesia and chrome, the larger non-plastic particles may be entirely magnesia and the smaller non-plastic particles entirely chrome, if the bond is sodium silicate, an organic substance or clay dispersed by an electrolyte. The larger non-plastic particles may be entirely chrome, and the smaller non-plastic particles may be entirely magnesia, with any of the bonds mentioned above. Also the larger particles may be a mixture of magnesia and chrome, with smaller particles which are entirely magnesia, entirely chrome, or a mixture of magnesia and chrome.

In stating percentages of magnesia and/or chrome particles, I of course intend that these percentages shall be subject to deduction for the percentage of bond. Thus the suggested ranges of 45% to 65% (preferably 52% to 58%) of larger non-plastic particles and 55% to 35% (preferably 48% to 42%) of smaller non-plastic particles are subject to deductions from the lower limit in each case for the percentage of bond.

All percentages mentioned herein are percentages by weight unless the context clearly indicates that they are percentages by volume, as in the case of porosity, void space, etc. All percentages are based upon the dried unfired brick which is ready for use in a furnace lining. Thus when I refer to a certain percentage of water soluble bond, I do not include the water which is used as a vehicle for the bond, and to moisten the mix, when the bond is added, but merely mean that, of the dried unfired brick, the bond comprises a certain percentage by weight.

A typical analysis of a suitable magnesia or dead-burned magnesite is:

| | Per cent |
|---|---|
| MgO (by difference) | 84.50 |
| CaO | 4.50 |
| Fe$_2$O$_3$ | 5.00 |
| Al$_2$O$_3$ | 1.50 |
| SiO$_2$ | 4.00 |
| Loss on ignition | 0.50 |
| | 100.00 |

If lower quality is permissible, the lime may be greater than 7% but should not be within the range of calcined dolomite. Magnesites may fall as low as 60% to 65% MgO content if higher amounts of CaO and Fe$_2$O$_3$ or other basic oxides are present. The magnesites may be prepared for use by dead burning in kilns at about 1500° C. or by electrical fusion.

Whenever I mention chrome I mean chrome ore of the type used in making refractory brick or calcined chrome ore. Sodium acid sulphate as mentioned herein may be the "nitrate cake" of commerce. Sodium silicate as used in my invention may be the liquid variety, "water glass", or the solid variety. When I speak of the amount of sodium silicate used as a bond, I refer to the quantity of anhydrous sodium silicate. If a solution of sodium silicate or a hydrated solid sodium silicate be used, an increased amount of binder will be necessary to compensate for the water present. Various commercial sodium silicates have different ratios of Na$_2$O to SiO$_2$, for example, 1:4; 1:2.4. Such silicates are all applicable as bonding agents.

In referring to my earlier patents, I intend to incorporate their disclosures herein by reference and make them a part hereof.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of making a refractory of high density from non-plastic material preponderantly magnesia, and a bonding substance, using non-plastic particles of relatively larger and smaller grain sizes, which consists in mixing larger non-plastic particles retained on a 30 mesh per linear inch screen with smaller non-plastic particles and a bonding substance, while employing not more than a relatively small proportion of intermediate grain sizes, using a preponderant amount of magnesia in the mix, in molding the mix in moist condition into a refractory shape, in drying the refractory shape and in subjecting the dried unburned refractory shape to firing temperature in a furnace structure during use.

2. The method of making a refractory of high density from non-plastic material preponderantly magnesia, and a bonding substance, using non-plastic particles of relatively larger and smaller grain sizes, which consists in mixing larger non-plastic particles retained on a 30 mesh per linear inch screen with smaller non-plastic particles and a bonding substance, while employing not more than a relatively small proportion of intermediate grain sizes, using a preponderant amount of magnesia in the mix, in molding the mix in moist condition under pressure into a refractory shape, in drying the refractory shape and in subjecting the dried unburned refractory shape to firing temperature in a furnace structure during use.

3. The method of making a refractory of high density from non-plastic material preponderantly magnesia, and a bonding substance, using non-plastic particles of relatively larger and smaller grain sizes, which consists in mixing larger non-plastic particles retained on a 20 mesh per linear inch screen with smaller non-plastic particles and a bonding substance, while employing not more than a relatively small proportion of intermediate grain sizes, using a preponderant amount of magnesia in the mix, in molding the mix in moist condition under pressure into a refractory shape, in drying the refractory shape and in subjecting the dried unburned refractory shape to firing temperature in a furnace structure during use.

4. The method of making a refractory of high density from non-plastic material preponderantly magnesia, and a bonding substance, using non-plastic particles of relatively larger and smaller grain sizes, which consists in mixing larger non-plastic particles retained on a 30 mesh per linear inch screen with smaller non-plastic particles below 60 mesh per linear inch and a bonding substance, while employing not more than a relatively small proportion of intermediate grain sizes, using a preponderant amount of magnesia in the mix, in molding the mix in moist condition under pressure into a refractory shape, in drying the refractory shape and in subjecting the dried unburned refractory shape to firing temperature in a furnace structure during use.

5. The method of making a refractory of high density from non-plastic material preponderantly magnesia, and a water soluble bond, using non-plastic particles of relatively larger and smaller grain sizes, which consists in mixing larger non-plastic particles between 3 and 30 mesh per linear inch in the proportion of 45% to 65% with smaller non-plastic particles below 50 mesh per linear inch in the proportion of 55% to 35%, and with an appreciable amount but less than 5% of a water soluble bond, maintaining the mixture free from insoluble bond and incorporating a preponderant amount of magnesia in the mixture, in molding the mixture in moist condition under a pressure exceeding 1000 pounds per square inch, in drying the mixture and in subjecting the dried unburned mixture to firing temperature in a furnace structure during use.

6. The method of making a refractory of high density from non-plastic material preponderantly magnesia, and a water soluble bond, using non-plastic particles of relatively larger and smaller grain sizes, which consists in mixing larger non-plastic particles between 6 and 30 mesh per linear inch in the proportion of 45% to 65% with smaller non-plastic particles below 50 mesh per linear inch in the proportion of 55% to 35%, and with an appreciable amount but less than 3% of sodium silicate, incorporating a preponderant amount of magnesia in the mixture, in molding the mixture in moist condition under a pressure exceeding 1000 pounds per square inch, in drying the mixture and in subjecting the dried unburned mixture to firing temperature in a furnace structure during use.

7. The method of making a refractory of high density from non-plastic material preponderantly magnesia, and an organic bond, using non-plastic particles of relatively larger and smaller grain sizes, which consists in mixing larger non-plastic particles between 6 and 30 mesh per linear inch in the proportion of 45% to 65% with smaller non-plastic particles below 50 mesh per linear inch in the proportion of 55% to 35%, and with an appreciable amount but less than 3% of an organic bond, incorporating a preponderant amount of magnesia in the mixture, in molding the mixture in moist condition under a pressure exceeding 1000 pounds per square inch, in drying the mixture and in subjecting the dried unburned mixture to firing temperature in a furnace structure during use.

8. The method of making a refractory of high density from magnesia and a bonding substance, using larger and smaller grain sizes, which consists in mixing larger magnesia particles retained on a 30 mesh per linear inch screen with smaller magnesia particles and a bonding substance, while employing not more than a relatively small proportion of intermediate grain sizes, in molding the mix in moist condition under pressure into a refractory shape, in drying the refractory shape and in subjecting the dried unburned refractory shape to firing temperature in a furnace structure during use.

9. The method of making a refractory of high density from magnesia and a water soluble bond, using relatively larger and smaller grain sizes, which consists in mixing larger magnesia particles between 3 and 30 mesh per linear inch in the proportion of 45% to 65% with smaller magnesia particles below 50 mesh per linear inch in the proportion of 55% to 35%, and with an appreciable amount but less than 5% of a water soluble bond, maintaining the mixture free from insoluble bond, in molding the mixture in moist condition under a pressure exceeding 1000 pounds per square inch, in drying the mixture and in subjecting the dried unfired mixture to firing temperature in a furnace structure during use.

10. The method of making a refractory of high density from a mixture of magnesia and chrome containing more magnesia than chrome, and a bonding substance, using larger and smaller grain sizes, which consists in mixing together magnesia and chrome particles, with an excess of magnesia, using larger particles between 10 and 30 mesh per linear inch with smaller particles below 60 mesh per linear inch, in roughly equal proportions, and with a bonding substance, in molding the mixture in moist condition under high pressure, in drying the brick thus formed and in placing the dry unburned brick in a furnace structure.

11. The method of making a refractory of high density from a mixture of magnesia and chrome containing more magnesia than chrome, and a water soluble bond, using relatively larger and smaller grain sizes, which consists in mixing together magnesia and chrome particles with an excess of magnesia, using larger particles between 3 and 30 mesh per linear inch in the proportion of 45% to 65% with smaller particles below 50 mesh per linear inch in the proportion of 55% to 35%, and with an appreciable amount but less than 5% of water soluble bond, in molding the mixture in moist condition under pressure exceeding 1000 pounds per square inch, in drying the mixture and in subjecting the dried unburned mixture to firing temperature in a furnace structure during use.

12. A dry refractory body preponderantly containing magnesia, said body having low porosity, being in unfired condition and suitable for use in unfired condition, and comprising a bonding substance distributed through a densely compacted mixture of larger non-plastic particles capable of being retained on a screen of 30 mesh per linear inch and smaller non-plastic particles capable of passing through a screen of 60 mesh per linear inch, in roughly equal proportions.

13. A dry refractory brick preponderantly containing magnesia, said brick having low porosity, being in unfired condition and suitable for use in unfired condition, and comprising a densely compacted mixture of about equal proportions of larger non-plastic particles between 10 and 30 mesh per linear inch and smaller non-plastic particles below 60 mesh per linear inch and a water soluble bond.

14. A non-plastic refractory brick preponderantly containing magnesia, comprising about 55% of larger non-plastic particles between 10 and 30 mesh per linear inch, about 45% of smaller non-plastic particles below 60 mesh per linear inch and a water soluble binder in dry form, the brick being of requisite cold strength for use in unfired condition.

15. A dry refractory brick preponderantly containing magnesia, said brick having low porosity, being in unfired condition and suitable for use in unfired condition, comprising a densely compacted mixture of between 45% and 65% of larger non-plastic particles between 3 and 30 mesh per linear inch and between 55% and 35% of smaller non-plastic particles below 50 mesh per linear inch and an appreciable amount but less than 5% of a water soluble bond in the mixture, and being free from insoluble bond.

16. A dry refractory brick preponderantly containing magnesia, said brick having low porosity, being in unfired condition and suitable for use in unfired condition, comprising a densely compacted mixture of between 45% and 65% of larger non-plastic particles between 3 and 30 mesh per linear inch and between 55% and 35% of smaller non-plastic particles below 50 mesh per linear inch and an appreciable amount but less than 3% of sodium silicate in the mixture.

17. A dry refractory brick preponderantly containing magnesia, said brick having low porosity, being in unfired condition and suitable for use in unfired condition, comprising a densely compacted mixture of between 45% and 65% of larger non-plastic particles between 3 and 30 mesh per linear inch and between 55% and 35% of smaller non-plastic particles below 50 mesh per linear inch and an appreciable amount but less than 3% of organic binder in the mixture.

18. A dry magnesia brick having low porosity, being in unfired condition and suitable for use in unfired condition, comprising a densely compacted mixture of between 45% and 65% of larger non-plastic particles between 3 and 30 mesh per linear inch and between 55% and 35% of smaller non-plastic particles below 50 mesh per linear inch and an appreciable amount but less than 3% of water soluble bond in the mixture, and being free from insoluble bond.

19. A dry magnesia-chrome brick containing more magnesia than chrome, having low porosity, being in unfired condition and suitable for use in unfired condition, comprising a densely compacted mixture of between 45% and 65% of larger non-plastic particles between 3 and 30 mesh per linear inch and between 55% and 35% of smaller non-plastic particles below 50 mesh per linear inch and an appreciable amount but less than 5% of water soluble bond in the mixture.

RUSSELL P. HEUER.